United States Patent
Lee et al.

(10) Patent No.: US 11,355,821 B2
(45) Date of Patent: Jun. 7, 2022

(54) METHOD OF WELDING ELECTRODE TAB AND CABLE TYPE RECHARGEABLE BATTERY INCLUDING ELECTRODE MANUFACTURED ACCORDING TO THE SAME

(71) Applicant: LG CHEM, LTD., Seoul (KR)

(72) Inventors: Jin Soo Lee, Daejeon (KR); So Young Choo, Daejeon (KR); Ju Ryoun Kim, Daejeon (KR); Bu Gon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 111 days.

(21) Appl. No.: 16/626,839

(22) PCT Filed: Jun. 27, 2018

(86) PCT No.: PCT/KR2018/007268
§ 371 (c)(1),
(2) Date: Dec. 26, 2019

(87) PCT Pub. No.: WO2019/004719
PCT Pub. Date: Jan. 3, 2019

(65) Prior Publication Data
US 2020/0168885 A1    May 28, 2020

(30) Foreign Application Priority Data
Jun. 27, 2017    (KR) .......................... 10-2017-0081403

(51) Int. Cl.
*H01M 4/00*    (2006.01)
*H01M 50/531*    (2021.01)
(Continued)

(52) U.S. Cl.
CPC .......... *H01M 50/531* (2021.01); *B23K 26/22* (2013.01); *H01M 4/667* (2013.01)

(58) Field of Classification Search
CPC ...... H01M 50/531; H01M 4/667; H01M 4/02; H01M 10/04; H01M 10/058;
(Continued)

(56) References Cited

U.S. PATENT DOCUMENTS 9,947,913 B2    4/2018   Lee et al.
9,966,592 B2    5/2018   Stern et al.
(Continued)

FOREIGN PATENT DOCUMENTS

CN    105555466 A    5/2016
CN    205609666 U    9/2016
(Continued)

OTHER PUBLICATIONS

Machine translation of JP2015015147A, obtained Jun. 2021 (Year: 2015).*

(Continued)

*Primary Examiner* — Nicholas P D'Aniello
(74) *Attorney, Agent, or Firm* — Dentons US LLP (57) ABSTRACT

The present invention relates to a method of welding an electrode tab which welds an electrode tab and a current collecting layer by using a pulsed laser beam, and a cable type rechargeable battery including an electrode manufactured according to the same.

15 Claims, 7 Drawing Sheets

(51) Int. Cl.
B23K 26/22 (2006.01)
H01M 4/66 (2006.01)
(58) Field of Classification Search
CPC .. H01M 10/0587; H01M 4/04; H01M 10/052; H01M 2004/025; B23K 26/22; B23K 26/21; B23K 2101/38; Y02P 70/50; Y02E 60/10
See application file for complete search history.

(56) References Cited

U.S. PATENT DOCUMENTS

| | | | |
|---|---|---|---|
| 2004/0079738 A1 | 4/2004 | Sakamoto et al. | |
| 2014/0113185 A1 | 4/2014 | Mori et al. | |
| 2014/0255741 A1* | 9/2014 | Kwon | H01M 4/134 429/94 |
| 2016/0211500 A1* | 7/2016 | Lee | B23K 26/0622 |

FOREIGN PATENT DOCUMENTS

| | | |
|---|---|---|
| DE | 10 2012 221780 A1 | 5/2014 |
| JP | 2005-129497 A | 5/2005 |
| JP | 2015-015147 A | 1/2015 |
| KR | 10-1998-0037992 A | 8/1998 |
| KR | 10-2014-0047091 A | 4/2014 |
| KR | 10-2014-0058398 A | 5/2014 |
| KR | 10-2015-0045388 A | 4/2015 |
| KR | 10-2015-0143048 A | 12/2015 |
| KR | 10-2015-0143049 A | 12/2015 |

OTHER PUBLICATIONS

Machine translation of DE102012221780A1 obtained Sep. 4, 2021 (Year: 2012).*

* cited by examiner

Irradiation surface

[Figure 4B]

Lower end surface

METHOD OF WELDING ELECTRODE TAB AND CABLE TYPE RECHARGEABLE BATTERY INCLUDING ELECTRODE MANUFACTURED ACCORDING TO THE SAME

The present application is a National Phase entry pursuant to 35 U.S.C. 371 of International Application No. PCT/KR2018/007268 filed Jun. 27, 2018, and claims priority to and the benefit of Korean Patent Application No. 10-2017-0081403 filed in the Korean Intellectual Property Office on Jun. 27, 2017, the entire contents of which are incorporated herein by reference.

FIELD

The present invention relates to a method of welding an electrode tab and a cable type rechargeable battery including an electrode manufactured according to the same.

BACKGROUND

A rechargeable battery refers to a device that converts external electrical energy into chemical energy, stores the chemical energy, and generates electricity when the electricity is required. The rechargeable battery has both economic advantages and environmental advantages compared to a primary battery used as a disposable battery.

An electrode for a rechargeable battery is configured such that an insulating layer, a current collecting layer, a primer layer, and an electrode active material layer are sequentially provided. Further, to allow the electrode to be actually used for the rechargeable battery, an electrode tab needs to be welded to the current collecting layer so that an electric current may be moved to the outside of the electrode.

However, there is a problem in that welding quality deteriorates due to contamination caused by the electrode active material layer and the insulating layer during the process of welding the electrode, and as a result, welding needs to be performed after completely removing the electrode active material layer and the insulating layer in order to solve the problem of the contamination of the electrode.

However, the removal of the insulating layer according to the aforementioned method causes a problem in that flexibility and durability deteriorate such that the electrode cannot be used for a cable type battery.

Accordingly, there is a need for multifarious researches for minimizing deterioration in weld quality caused by contamination resulting from the welding of the electrode tab and for diversifying welding methods and conditions in order to simplify electrode manufacturing processes.

DOCUMENT OF RELATED ART

Patent Document

Japanese Patent Application Laid-Open No. 2005-129497

SUMMARY

The present invention provides a method of welding an electrode tab and a cable type rechargeable battery including an electrode manufactured according to the same.

An exemplary embodiment of the present invention provides a method of welding an electrode tab, the method including: preparing an electrode stack with an insulating layer, a current collecting layer, and a primer layer, sequentially provided; forming an electrode active material layer which is provided on the primer layer and has a region to which the primer layer is exposed; laminating an electrode tab in the region to which the primer layer is exposed; and welding the electrode tab and the current collecting layer by irradiating a pulsed laser beam, in which transmittance of the insulating layer is 50% or more at a wavelength of 400 nm to 1,200 nm, and the pulsed laser beam penetrates through the insulating layer and is emitted in a direction from the insulating layer to the current collecting layer.

Another exemplary embodiment of the present invention provides a cable type rechargeable battery including: an internal electrode with a separation layer on outer surface thereof; and an external electrode which is spirally provided on an outer surface of the separation layer, in which at least one of the external electrode and the internal electrode is an electrode welded according to the method of welding an electrode tab.

The method of welding an electrode tab according to the exemplary embodiment of the present invention does not include a process of removing the insulating layer and the primer layer, and as a result, there is an advantage in that the process of welding an electrode tab and the process of manufacturing an electrode are simplified.

In addition, the method of welding an electrode tab according to the exemplary embodiment of the present invention has an advantage in that damage to the insulating layer is minimized and flexibility and durability of the electrode are ensured.

The method of welding an electrode tab according to the exemplary embodiment of the present invention has an advantage in that welding quality may be improved by irradiating a pulsed laser beam and adjusting a condition thereof.

DETAILED DESCRIPTION

When one member is disposed "on" another member in the present specification, this includes not only a case where the one member is brought into contact with another member, but also a case where still another member is present between the two members.

When one part "includes" one constituent element in the present specification, unless otherwise specifically described, this does not mean that another constituent element is excluded, but means that another constituent element may be further included.

Throughout the specification of the present application, the term "transmittance" means a ratio of the amount of light penetrating through a member to the amount of light entering the member. In this case, the amount of light entering the member and the amount of light penetrating through the member may be measured by using a spectrophotometer (Lambda 950, PerkinElmer, Inc.) or the like.

The present inventors have ascertained that when ultrasonic vibration is applied to a current collecting layer, welding quality deteriorates if an electrode active material layer, a primer layer, and an insulating layer are not completely removed during a process of welding an electrode tab for manufacturing an electrode for a rechargeable battery. Accordingly, the present inventors have conducted continuous research to solve the aforementioned problems by minimizing the process of removing the respective layers that constitute the electrode for a rechargeable battery and concretely specifying a direction and a condition of laser irradiation, and have developed a method of welding an electrode tab which will be described below.

Hereinafter, the present specification will be described in more detail.

An exemplary embodiment of the present invention provides a method of welding an electrode tab, the method including: preparing an electrode stack having an insulating layer, a current collecting layer, and a primer layer, which are sequentially provided; forming an electrode active material layer which is provided on the primer layer and has a region to which the primer layer is exposed; laminating an electrode tab in the region in which the primer layer is exposed; and welding the electrode tab and the current collecting layer by irradiating a pulsed laser beam, in which transmittance of the insulating layer is 50% or more at a wavelength of 400 nm to 1,200 nm, and the pulsed laser beam penetrates through the insulating layer and is emitted in a direction from the insulating layer to the current collecting layer.

According to the exemplary embodiment of the present invention, the insulating layer may be provided on an outer surface of the current collecting layer in order to protect an electrode from moisture in air and external impact. The insulating layer may be made of typical polymeric resin including a moisture blocking layer, and the polymeric resin may include at least one of polyethylene terephthalate (PET), polyvinyl chloride (PVC), high-density polyethylene (HDPE), and epoxy resin. However, any material is acceptable as long as the material may impart flexibility, and types of polymeric resin are not limited.

According to the exemplary embodiment of the present invention, the current collecting layer may be made of: stainless steel; aluminum, nickel, titanium, fired carbon, copper; stainless steel surface-treated with carbon, nickel, titanium, or silver; aluminum-cadmium alloy; non-conductive polymer surface-treated with a conductive material; conductive polymer; metal paste including metal powder made of Ni, Al, Au, Ag, Al, Pd/Ag, Cr, Ta, Cu, Ba, or indium tin oxide (ITO); or carbon paste including carbon powder made of graphite, carbon black, or carbon nanotube, but types of materials of the current collecting layer are not limited.

According to an exemplary embodiment of the present invention, the primer layer may include a conductive material and a binder. Since the primer layer includes the conductive material and the binder, the primer layer may serve as both a conductive layer and a bonding layer on an electrode.

Specifically, the primer layer may effectively bond the electrode active material layer and the current collecting layer, may reduce resistance of the electrode by improving conductivity of the electrode active material layer, and may prevent deterioration in performance of a battery. Specifically, the primer layer may be provided between the current collecting layer and the electrode active material layer.

According to the exemplary embodiment of the present invention, the conductive material may include at least one of carbon black, acetylene black, Ketjen black, carbon fiber, carbon nanotube, and graphene, but types of conductive materials are not limited.

According to the exemplary embodiment of the present invention, the binder may include at least one of polyvinylidene fluoride (PVDF), polyvinylidene fluoride-co-hexafluoropropylene, polyvinylidene fluoride-co-trichloroethylene, polybutyl acrylate, polymethyl methacrylate, polyacrylonitrile, polyvinylpyrrolidone, polyvinylacetate, ethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, styrene-butadiene rubber, acrylonitrile-styrene-butadiene copolymer, and polyimide. However, types of binders are not limited.

According to the exemplary embodiment of the present invention, the electrode active material layer may be provided on the primer layer, and may have a region in which the primer layer is exposed.

According to the exemplary embodiment of the present invention, in a case in which the electrode is a negative electrode for a rechargeable battery, the electrode active material layer may include at least one of: natural graphite, artificial graphite, or carbonous materials; metal (Me) such as Si, Sn, Li, Zn, Mg, Cd, Ce, Ni, or Fe; alloys including the aforementioned metal (Me); oxide (MeOx) of the aforementioned metal (Me) or lithium titanium oxide (LTO); and composites made of the aforementioned metal (Me) and carbon.

According to the exemplary embodiment of the present invention, in a case in which the electrode is a positive electrode for a rechargeable battery, the electrode active material layer may include any one active material particle or a mixture of two or more active material particles selected from a group consisting of $LiCoO_2$, $LiNiO_2$, $LiMn_2O_4$, $LiCoPO_4$, $LiFePO_4$, $LiNiMnCoO_2$ and $LiNi_{1-x-y-z}Co_xM1_yM2_zO_2$ (M1 and M2 are each independently any one selected from a group consisting of Al, Ni, Co, Fe, Mn, V, Cr, Ti, W, Ta, Mg, and Mo, and x, y, and z are each independently an atomic fraction of oxide composition elements, and $0 \leq x < 0.5$, $0 \leq y < 0.5$, $0 \leq z < 0.5$, and $x+y+z \leq 1$).

According to the exemplary embodiment of the present invention, the laminating of the electrode tab in the region to which the primer layer is exposed may include bringing the electrode tab into contact with the region in which the primer layer is exposed.

According to the exemplary embodiment of the present invention, the electrode tab may be laminated on the electrode stack including the primer layer which is partially exposed to the outside.

Specifically, a partial region of the primer layer, which corresponds to a region in which the electrode tab is laminated, may be exposed, and the electrode tab may be laminated on the primer layer of which the partial region is exposed.

According to the exemplary embodiment of the present invention, the electrode tab, which is laminated in the region to which the primer layer is exposed, may be at least one of: stainless steel, aluminum, nickel, titanium, fired carbon, copper; stainless steel surface-treated with carbon, nickel, titanium, or silver; and an aluminum-cadmium alloy, but types of electrode tabs are not limited.

According to the exemplary embodiment of the present invention, the welding of the electrode tab and the current collecting layer may be performed by irradiating the pulsed laser beam. If the welding is performed by using ultrasonic vibration, an irradiation surface and a lower end surface of the electrode may be contaminated by the electrode active material layer or the insulating layer.

Figure 1:
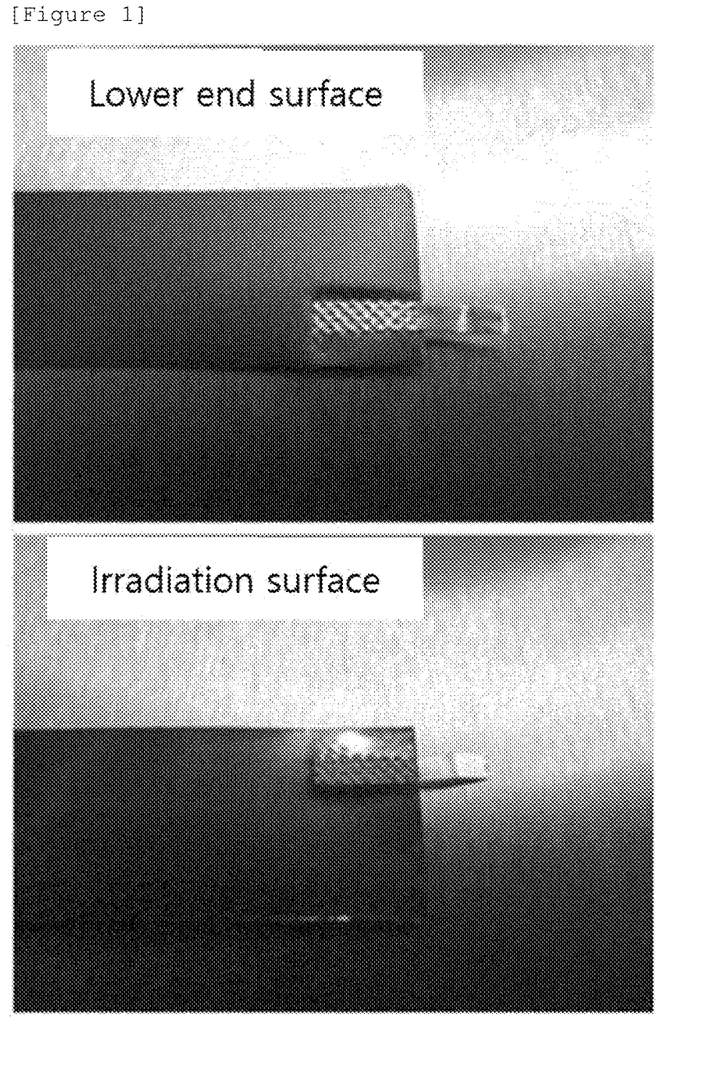
FIG. 1 is a view illustrating digital images of an electrode specimen manufactured by ultrasonic welding.

FIG. 1 is a view illustrating digital images of an electrode specimen manufactured by ultrasonic welding. Referring to FIG. 1, a portion where the electrode tab is provided on the electrode may mean the lower end surface, and a portion where the electrode is provided on the electrode tab may mean the irradiation surface.

According to the exemplary embodiment of the present invention, transmittance of the insulating layer may be 50% or more at a wavelength of 400 nm to 1,200 nm. Specifically, transmittance of the insulating layer to light having any one of wavelength values of 400 nm to 1,200 nm may be 50% or more. In addition, transmittance of the insulating layer may be 80% to 95% at a wavelength of 400 nm to 1,200 nm. In the case in which the transmittance of the insulating layer is within the aforementioned range, the pulsed laser beam may penetrate through the insulating layer while minimizing damage to the insulating layer when the pulsed laser beam is emitted in a direction from the insulating layer to the current collecting layer.

Figure 2:
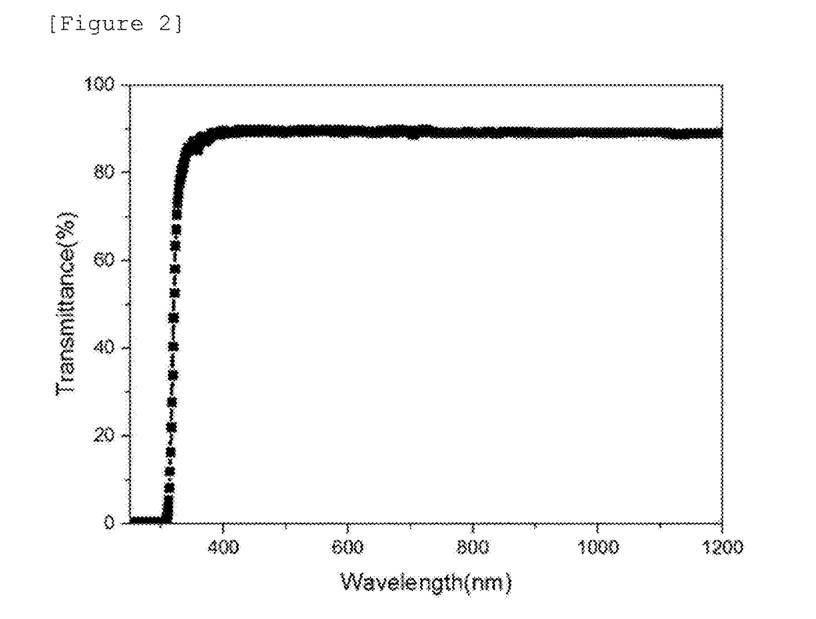
FIG. 2 is a view illustrating a transmittance curve in accordance with a wavelength range of an insulating layer included in an electrode stack according to an exemplary embodiment of the present invention.

FIG. 2 illustrates transmittance curve of the insulating layer according to the range of the wavelength. Referring to FIG. 2, it can be ascertained that the transmittance of the insulating layer is maintained to be 80% or more at the wavelength of 400 nm or more.

According to the exemplary embodiment of the present invention, the pulsed laser beam may penetrate through the insulating layer and may be emitted in the direction from the insulating layer to the current collecting layer.

In the case in which the pulsed laser beam is emitted in the direction from the insulating layer to the current collecting layer, damage to the electrode may be reduced in comparison with a case in which the pulsed laser beam is emitted in a direction from the current collecting layer to the insulating layer.

Specifically, in the case in which the pulsed laser beam is emitted in the direction from the current collecting layer to the insulating layer, the insulating layer may be damaged. More specifically, the electrode tab, which is thicker than the current collecting layer, needs to be melted so that the electrode tab is welded, a high-output pulsed laser beam needs to be emitted to melt the electrode tab, the current collecting layer may be deformed because the high-output pulsed laser beam is emitted, and the insulating layer may be damaged due to the deformation of the current collecting layer.

In addition, in the case in which the pulsed laser beam is emitted in the direction from the current collecting layer to the insulating layer, a welding bead may be formed on a surface of the electrode tab, which may degrade performance of the electrode, but in the case in which the pulsed laser beam is emitted in the direction from the insulating layer to the current collecting layer, the formation of the welding bead on the surface of the electrode tab may be minimized.

According to the exemplary embodiment of the present invention, the forming of the electrode active material layer may include providing the electrode active material layer on the primer layer, and exposing one region of the primer layer by removing one region of the electrode active material layer.

Figure 3A:
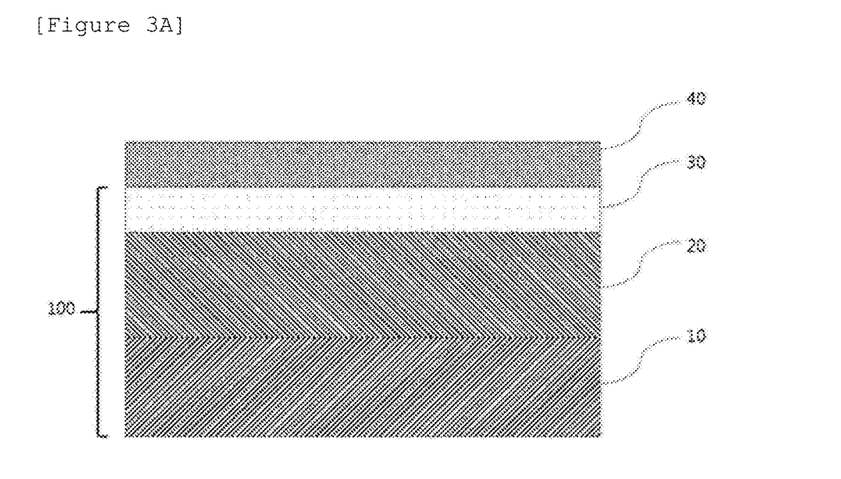
FIGS. 3A to 3C are schematic views illustrating a method of welding an electrode tab according to the exemplary embodiment of the present invention.
Figure 3B:
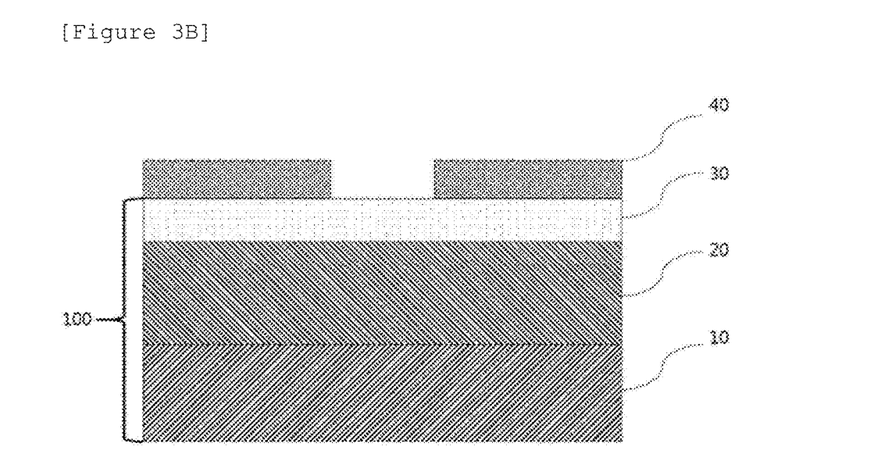
Figure 3C:
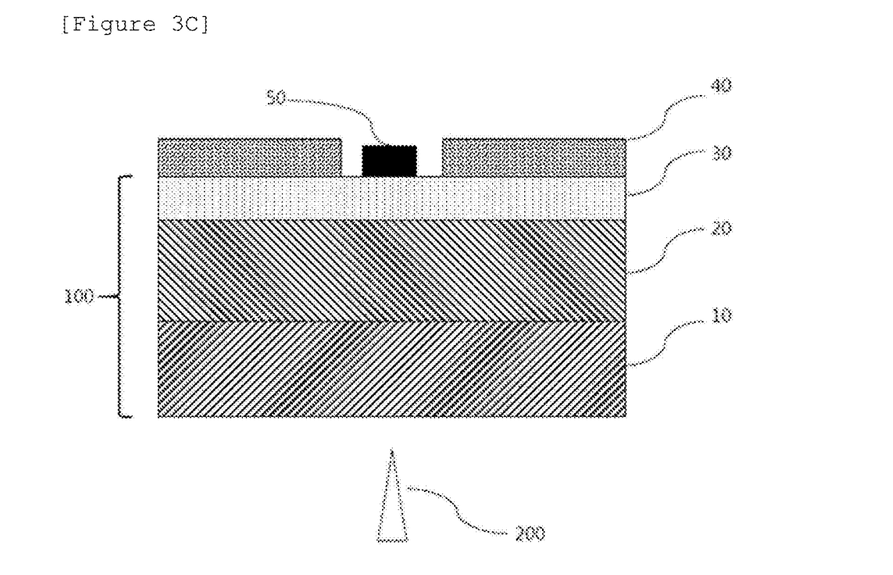

FIGS. 3A to 3C illustrate schematic views of the method of welding an electrode tab according to the exemplary embodiment of the present invention. Specifically, FIG. 3A is a view illustrating a state in which an electrode active material layer 40 is provided on a primer layer 30 of an electrode stack 100 including an insulating layer 10, a current collecting layer 20, and the primer layer 30. FIG. 3B is a view illustrating a state in which one region of the electrode active material layer 40 is removed and one region of the primer layer 30 is exposed. FIG. 3C is a view illustrating a state in which an electrode tab 50 is laminated in the exposed one region of the primer layer 30, and a pulsed laser beam 200 is emitted in a direction from the insulating layer 10 to the current collecting layer 20.

According to the exemplary embodiment of the present invention, the one region of the primer layer may be exposed by etching and removing the one region of the electrode active material layer. For example, the etching may be performed by applying an etching mask in the one region of the electrode active material layer and removing the one region of the electrode active material layer where the etching mask is not applied.

According to the exemplary embodiment of the present invention, the etching may be wet etching or dry etching.

According to the exemplary embodiment of the present invention, the wet etching may be performed by etching the one region of the electrode active material layer, where the etching mask is not applied, by using an etching solution, but the method is not limited. Specifically, the etching solution may include at least one of N-methylpyrrolidone (NMP), water, alcohol, dimethyl sulfoxide (DMSO), and acetone, but types of etching solutions are not limited.

According to the exemplary embodiment of the present invention, the dry etching may be performed by removing the electrode active material layer by irradiating the pulsed laser beam to the one region of the electrode active material layer where the etching mask is not applied, but the method is not limited.

According to the exemplary embodiment of the present invention, an emission condition of the pulsed laser beam emitted during the dry etching may be adjusted within an appropriate range by a user as necessary, and specifically, in a case in which a 50 W pulsed laser beam with an IR wavelength is used, an average output density of the pulsed laser beam may be set to 1 MW/cm$^2$ to 5 MW/cm$^2$.

According to the exemplary embodiment of the present invention, the forming of the electrode active material layer may include providing the electrode active material layer on the primer layer in a way to expose a region of the primer layer. Specifically, the electrode active material layer may not be provided in one region where the primer layer will be exposed, but the electrode active material layer may be provided in another region where the primer layer will not be exposed.

More specifically, as the method of providing the electrode active material layer in the region where the primer layer will not be exposed, a method such as screen printing, offset printing, flexographic printing, inkjet printing, slot die coating, slide coating, or curtain coating may be used, but the method is not limited.

According to the exemplary embodiment of the present invention, the welding of the electrode tab and the current collecting layer may include removing the primer layer being in contact with the electrode tab by irradiating with the pulsed laser beam, and welding the electrode tab and the current collecting layer.

Specifically, since the pulsed laser beam is emitted onto the current collecting layer, the current collecting layer may be heated, and the primer layer provided on the heated current collecting layer may be vaporized as the heated current collecting layer is deformed, such that the primer layer may be removed.

According to an exemplary embodiment of the present invention, the pulsed laser beam may be emitted by being focused on the current collecting layer. Specifically, the pulsed laser beam may be emitted by being focused on an interlayer between the current collecting layer and the insulating layer.

Since the pulsed laser beam is emitted by being focused on the current collecting layer, the current collecting layer may be deformed while absorbing energy of the laser beam, and the primer layer adjacent to the current collecting layer is vaporized as the current collecting layer is deformed, such that the current collecting layer and the electrode tab may be welded.

According to the exemplary embodiment of the present invention, a thickness of the primer layer may be 1 μm to 10 μm, specifically, 1 μm to 5 μm, and more specifically, 1 μm to 3 μm. In the case in which the thickness of the primer layer is within the aforementioned range, the electrode active material layer may be smoothly applied, and bonding force and conductivity of the primer layer may be ensured. In addition, as the pulsed laser beam is emitted and absorbed, the primer layer is sufficiently vaporized, such that the electrode tab may be smoothly welded to the current collecting layer.

According to an exemplary embodiment of the present specification, a thickness of the current collecting layer may be 5 μm to 30 μm. Specifically, the thickness of the current collecting layer may be 5 μm to 20 μm, 10 μm to 30 μm, or 10 μm to 20 μm. By adjusting the thickness of the current collecting layer to be within the aforementioned range, it is possible to minimize damage to the current collecting layer caused by the welding of the electrode tab, and it is possible to sufficiently weld the electrode tab.

According to the exemplary embodiment of the present invention, a thickness of the insulating layer may be 5 μm to 30 μm, and specifically, 10 μm to 20 μm. By adjusting the thickness of the insulating layer to be within the aforementioned range, it is possible to minimize damage to the electrode caused by the emission of the pulsed laser beam when welding the electrode tab, and it is possible to smoothly weld the electrode tab.

Specifically, in the case in which the thickness of the insulating layer is within the aforementioned range, it is possible to minimize damage to the insulating layer which is caused as energy absorbed by the current collecting layer when irradiating the pulsed laser beam is transmitted to the insulating layer, and it is possible to minimize damage to the insulating layer which is caused as the insulating layer directly absorbs energy by the emission of the pulsed laser beam. As a result, it is possible to provide a rechargeable battery in which deterioration in durability is minimized within the aforementioned range of the thickness of the insulating layer.

According to the exemplary embodiment of the present invention, a thickness of the electrode tab may be 80 μm to 500 μm, and specifically, 90 μm to 300 μm or 100 μm to 150 μm. In the case in which the thickness of the electrode tab is within the aforementioned range, it is possible to provide the electrode in which an increase in resistance and a thickness of a battery are minimized.

According to the exemplary embodiment of the present invention, a thickness of the electrode active material layer may be 20 μm to 150 μm, specifically, 20 μm to 130 μm, 40 μm to 150 μm, or 40 μm to 130 μm, more specifically, 40 μm to 110 μm, 70 μm to 130 μm, or 70 μm to 110 μm, and still more specifically, 90 μm to 100 μm. By adjusting the thickness of the electrode active material layer to be within the aforementioned range, it is possible to provide the electrode having excellent electrical conductivity and a large charging capacity.

According to the exemplary embodiment of the present invention, the electrode stack may further include a bonding layer between the current collecting layer and the insulating layer. Since the bonding layer is provided, it is possible to prevent the insulating layer from being separated from the current collecting layer.

According to the exemplary embodiment of the present invention, a thickness of the bonding layer may be 1 μm to 5 μm. In the case in which the thickness of the bonding layer is within the aforementioned range, it is possible to minimize damage to the insulating layer caused by the emission of the laser beam, and it is possible to prevent separation between the current collecting layer and the insulating layer.

According to the exemplary embodiment of the present invention, the bonding layer may be provided with a bonding agent known in the art, and types of bonding agents are not limited.

In the present specification, the pulsed laser beam may be a pulsed laser beam known in the art, and specifically, the pulsed laser beam may be a laser beam in the form of a pulse, that is, a laser beam of which the emission is performed and stopped over time.

According to the exemplary embodiment of the present invention, pulse energy of the pulsed laser beam may be 10 mJ to 30 mJ, specifically, 11 mJ to 30 mJ, 10 mJ to 25 mJ, or 11 mJ to 25 mJ, and more specifically, 12 mJ to 25 mJ, 11 mJ to 20 mJ, or 12 mJ to 20 mJ.

By adjusting the pulse energy of the pulsed laser beam to be within the aforementioned range, it is possible to minimize damage to the insulating layer. Specifically, by irradiating the pulsed laser beam having pulse energy within the aforementioned range, it is possible to minimize damage to the insulating layer caused by the emission of the pulsed laser beam while performing the welding of the electrode tab.

In the present specification, the pulse energy of the pulsed laser beam may mean energy outputted when the emission of the pulsed laser beam is performed and stopped once.

According to the exemplary embodiment of the present invention, a spot spacing distance of the pulsed laser beam may be 0.15 mm to 0.45 mm, specifically, 0.15 mm to 0.35 mm, 0.17 mm to 0.45 mm, or 0.17 mm to 0.35 mm, and more specifically, 0.2 mm to 0.35 mm, 0.17 mm to 0.25 mm, or 0.2 mm to 0.25 mm.

According to the exemplary embodiment of the present invention, the spot spacing distance of the pulsed laser beam, in a longitudinal direction of the electrode, may be 0.15 mm to 0.45 mm, specifically, 0.15 mm to 0.35 mm, and more specifically, 0.15 mm to 0.25 mm, and the spot spacing distance of the pulsed laser beam, in a width direction of the electrode, may be 0.15 mm to 0.35 mm, and specifically, 0.15 mm to 0.25 mm.

According to the exemplary embodiment of the present invention, by adjusting the spot spacing distance of the pulsed laser beam to be within the aforementioned range, it is possible to smoothly weld the electrode tab. Specifically, by adjusting the spot spacing distance of the pulsed laser beam to be within the aforementioned range, it is possible to minimize damage to the current collecting layer and the electrode tab, and it is possible to minimize a decrease in tensile strength caused by a decrease in energy of the emitted pulsed laser beam.

In the present specification, the spot spacing distance (spot align) of the pulsed laser beam may mean a distance between focal points of the emitted pulsed laser beams.

In the present specification, the longitudinal direction may be a selvage direction and may be perpendicular to a grain direction and a direction in which the insulating layer, the current collecting layer, and the primer layer are provided.

In the present specification, the width direction may be the grain direction and may be perpendicular to the selvage direction and the direction in which the insulating layer, the current collecting layer, and the primer layer are provided.

According to the exemplary embodiment of the present invention, a spot size of the pulsed laser beam may be 50 μm to 150 μm, specifically, 50 μm to 120 μm, 60 μm to 150 μm, or 60 μm to 120 μm, and more specifically, 60 μm to 100 μm, 80 μm to 120 μm, or 80 μm to 100 μm.

According to the exemplary embodiment of the present invention, a wavelength of the pulsed laser beam may be 400 nm to 1,200 nm.

According to the exemplary embodiment of the present invention, a medium of the pulsed laser beam may be a Yb doped fiber made by adding ytterbium to an optical fiber, but types of media are not limited.

According to the exemplary embodiment of the present invention, the method of welding the electrode tab may be a method of welding an electrode tab for a cable type rechargeable battery.

An electrode made by welding an electrode tab according to the exemplary embodiment of the present invention may be used as an electrode for a rechargeable battery. Specifically, the electrode made by welding the electrode tab may be used as a positive electrode and/or a negative electrode for a rechargeable battery. In addition, the electrode made by welding the electrode tab may be used as an electrode for a cable type rechargeable battery.

The electrode made by welding the electrode tab according to the exemplary embodiment of the present invention may be used as an internal electrode and/or an external electrode for a cable type rechargeable battery. In addition, the electrode made by welding the electrode tab may be used as a positive electrode and/or a negative electrode for a cable type rechargeable battery.

Another exemplary embodiment of the present invention provides a cable type rechargeable battery including: an internal electrode with a separation layer on outer surface thereof; and an external electrode which is spirally provided on an outer surface of the separation layer, in which at least one of the external electrode and the internal electrode is an electrode welded according to the method of welding an electrode tab.

According to the exemplary embodiment of the present invention, the internal electrode may include a current collecting layer, and an electrode active material layer formed on one surface of the current collecting layer, and the current collecting layer and the electrode active material layer may be identical to the current collecting layer and the electrode active material layer, respectively, in the method of welding an electrode tab.

According to the exemplary embodiment of the present invention, the separation layer may include at least any one of an electrolyte and an insulating film.

According to the exemplary embodiment of the present invention, the electrolyte may include at least one of a gel type polymeric electrolyte using polyethylene oxide, polyvinylidene fluoride, polyvinylidene fluoride-hexafluoropropylene, polymethyl methacrylate, polyacrylonitrile, or polyvinyl acetate; and a solid electrolyte using polyethylene oxide, polypropylene oxide, polyethylene imine, polyethylene sulfide, or polyvinyl acetate.

In addition, the electrolyte may further include lithium salt. The lithium salt may include at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, short chain aliphatic carboxylic acid lithium, and tetra phenyl boric acid lithium.

According to the exemplary embodiment of the present invention, the insulating film may be provided with: a porous polymeric substrate manufactured by using polyolefin-based polymer selected from a group consisting of ethylene homopolymer, propylene homopolymer, ethylene-butene copolymer, ethylene-hexene copolymer, and ethylene-methacrylate copolymer; a porous polymeric substrate manufactured by using polymer selected from a group consisting of polyester, polyacetal, polyamide, polycarbonate, polyimide, polyether ether ketone, polyether sulfone, polyphenylene oxide, polyphenylene sulfide, modified polyethylene terephthalate, and polyethylene naphthalate; a porous substrate made of a mixture of inorganic substance particles and binder polymer; or a porous coating layer formed of a mixture of inorganic substance particles and binder polymer on at least one surface of the porous polymeric substrate.

EXAMPLES

Hereinafter, the present invention will be described in detail with reference to Examples for specifically describing the present invention. However, the Examples according to the present invention may be modified in various forms, and it is not interpreted that the scope of the present invention is limited to the Examples to be described below. The Examples of the present specification are provided for more completely explaining the present invention to the person with ordinary skill in the art.

Example 1

An electrode stack having a polyethylene terephthalate (PET) insulating layer, an aluminum current collecting layer, and a primer layer, sequentially provided, was prepared.

A thickness of the insulating layer was about 15 μm, and transmittance of the insulating layer was 90% or more at a wavelength of 400 nm to 1,200 nm. A thickness of the current collecting layer was about 20 μm. The primer layer included carbon black and polyvinylidene fluoride (PVDF), and a thickness of the primer layer was about 3 μm.

An electrode active material layer including $LiCoO_2$ was provided on the primer layer included in the electrode stack. A length of the electrode active material layer was about 25 mm, a width of the electrode active material layer was about 10 mm, and a thickness of the electrode active material layer was about 95 μm.

An etching mask was formed in a partial region of the electrode active material layer, and a partial region of the electrode active material layer where the etching mask was not formed was processed with an N-methylpyrrolidone (NMP) solution, such that the partial region of the electrode active material layer where the etching mask was not formed was removed, and as a result, a partial region of the primer layer was exposed.

An aluminum electrode tab having a length of 20 mm, a width of 1.5 mm, and a thickness of 100 μm was laminated on the partially exposed part of the primer layer.

A pulsed laser beam having pulse energy of 12.5 mJ, a spot spacing distance of 0.2 mm in a longitudinal direction, a spot spacing distance of 0.2 mm in a width direction, and a spot size of about 90 μm was emitted by being focused onto the aluminum current collecting layer in a direction from the polyethylene terephthalate insulating layer to the aluminum current collecting layer by using a pulsed laser beam emitter (R4 of SPI), thereby welding the electrode tab to the electrode stack.

Example 2

An electrode tab was welded to an electrode stack by a method identical to the method of Example 1 except that pulse energy was 17.5 mJ.

Example 3

An electrode tab was welded to an electrode stack by a method identical to the method of Example 1 except that pulse energy was 25 mJ.

Example 4

An electrode tab was welded to an electrode stack by a method identical to the method of Example 1 except that a laser beam having a spot spacing distance of 0.3 mm in a longitudinal direction and a spot spacing distance of 0.2 mm in a width direction was emitted.

Example 5

An electrode tab was welded to an electrode stack by a method identical to the method of Example 1 except that a laser beam having a spot spacing distance of 0.4 mm in a longitudinal direction and a spot spacing distance of 0.2 mm in a width direction was emitted.

Example 6

An electrode tab was welded to an electrode stack by a method identical to the method of Example 1 except that a laser beam having a spot spacing distance of 0.2 mm in a longitudinal direction and a spot spacing distance of 0.3 mm in a width direction was emitted.

Comparative Example 1

An electrode tab was welded to an electrode stack by a method identical to the method of Example 1 except that pulse energy was 35 mJ.

Comparative Example 2

An electrode tab was welded to an electrode stack by a method identical to the method of Example 1 except that pulse energy was 50 mJ.

Comparative Example 3

An electrode tab was welded to an electrode stack by a method identical to the method of Example 1 except that an ultrasonic wave was emitted under a condition in which an amplitude was 40% and welding time was 1 second by using an ultrasonic emitter (Branson) instead of the pulsed laser beam.

Comparative Example 4

An electrode tab was welded to an electrode stack by a method identical to the method of Example 1 except that a laser beam having a spot spacing distance of 0.1 mm in a longitudinal direction and a spot spacing distance of 0.2 mm in a width direction was emitted.

Comparative Example 5

An electrode tab was welded to an electrode stack by a method identical to the method of Example 1 except that a laser beam having a spot spacing distance of 0.2 mm in a longitudinal direction and a spot spacing distance of 0.1 mm in a width direction was emitted.

The following Table 1 shows a summary of information of the welding methods according to Examples 1 to 6 and Comparative Examples 1 to 5.

TABLE 1

| Items | Pulse Energy (mJ) | Spot Spacing Distance (Longitudinal Direction mm × Width Direction mm) | Remarks |
|---|---|---|---|
| Example 1 | 12.5 | 0.2 × 0.2 | — |
| Example 2 | 17.5 | 0.2 × 0.2 | — |
| Example 3 | 25 | 0.2 × 0.2 | — |
| Example 4 | 12.5 | 0.3 × 0.2 | — |
| Example 5 | 12.5 | 0.4 × 0.2 | — |
| Example 6 | 12.5 | 0.2 × 0.3 | — |
| Comparative Example 1 | 35 | 0.2 × 0.2 | — |
| Comparative Example 2 | 50 | 0.2 × 0.2 | — |
| Comparative Example 3 | — | — | Ultrasonic Welding |
| Comparative Example 4 | 12.5 | 0.1 × 0.2 | — |
| Comparative Example 5 | 12.5 | 0.2 × 0.1 | — |

Evaluation

1. Measurement of Tensile Strength

The following Table 2 shows tensile strength values which are measured when each of the electrodes for a rechargeable battery, which have the welded electrode tabs and are manufactured according to Examples 1 to 3 and Comparative Examples 1 to 3, is fractured by extending each of the electrodes in the longitudinal direction at a tension speed of 10 mm/min.

The following Table 3 shows tensile strength values which are measured when each of the electrodes for a rechargeable battery, which have the electrode tabs welded according to Examples 1, 4 and 5 and Comparative Example 4, is fractured by extending each of the electrodes in the longitudinal direction at a tension speed of 10 mm/min.

The following Table 4 shows tensile strength values which are measured when each of the electrodes for a rechargeable battery, which have the electrode tabs welded according to Examples 1 and 6 and Comparative Example 5, is fractured by extending each of the electrodes in the longitudinal direction at a tension speed of 10 mm/min.

TABLE 2

| Items | Pulse Energy (mJ) | Spot Spacing Distance (Longitudinal Direction mm × Width Direction mm) | Tensile Strength (kgf) |
|---|---|---|---|
| Example 1 | 12.5 | 0.2 × 0.2 | 1.17 |
| Example 2 | 17.5 | 0.2 × 0.2 | 1.09 |
| Example 3 | 25 | 0.2 × 0.2 | 0.92 |
| Comparative Example 1 | 35 | 0.2 × 0.2 | 0.68 |
| Comparative Example 2 | 50 | 0.2 × 0.2 | 0.63 |
| Comparative Example 3 | Ultrasonic Welding | | 1.01 |

TABLE 3

| Items | Pulse Energy (mJ) | Spot Spacing Distance (Longitudinal Direction mm × Width Direction mm) | Tensile Strength (kgf) |
|---|---|---|---|
| Example 1 | 12.5 | 0.2 × 0.2 | 1.17 |
| Example 4 | 12.5 | 0.3 × 0.2 | 1.14 |
| Example 5 | 12.5 | 0.4 × 0.2 | 1.05 |
| Comparative Example 4 | 12.5 | 0.1 × 0.2 | 0.99 |

TABLE 4

| Items | Pulse Energy (mJ) | Spot Spacing Distance (Longitudinal Direction mm × Width mm) Direction | Tensile Strength (kgf) |
|---|---|---|---|
| Example 1 | 12.5 | 0.2 × 0.2 | 1.17 |
| Example 6 | 12.5 | 0.2 × 0.3 | 1.05 |
| Comparative Example 5 | 12.5 | 0.2 × 0.1 | 1.13 |

2. Capturing of Cross-Sectional Image

Images of irradiation surfaces of the electrodes for a rechargeable battery, which had the electrode tabs welded according to Examples 1, 5, and 6 and Comparative Example 2, were captured by using an optical microscope (Olympus BX51M).

Images of lower end surfaces of the electrodes for a rechargeable battery, which had the electrode tabs welded according to Example 1 and Comparative Example 2, were captured by using an optical microscope (Olympus BX51M).

Evaluation Result

Table 2 shows tensile strength of the electrodes for a rechargeable battery welded while changing pulse energy of pulsed laser beams. The tensile strength needs to have a value approximate to 1 kgf so that the electrode may be applied to the cable type rechargeable battery.

According to Table 2, it can be ascertained that the electrodes according to Examples 1 to 3 may be applied to the cable type rechargeable battery, but the electrodes according to Comparative Examples 1 and 2 cannot be applied to the cable type rechargeable battery.

In addition, it can be ascertained that in the case of Comparative Example 3 in which the electrode tab is welded by ultrasonic welding, the tensile strength value is a value that may be applied to the cable type rechargeable battery, but the electrode cannot be applied to the cable type rechargeable battery due to damage to the insulating layer.

Further, it can be ascertained that in a case in which the electrode is welded by using ultrasonic waves, the current collecting layer and the insulating layer are damaged, and as a result, the pulsed laser beam needs to be used to minimize contamination of the electrode caused by the damage to the current collecting layer and the insulating layer.

Figure 4A:
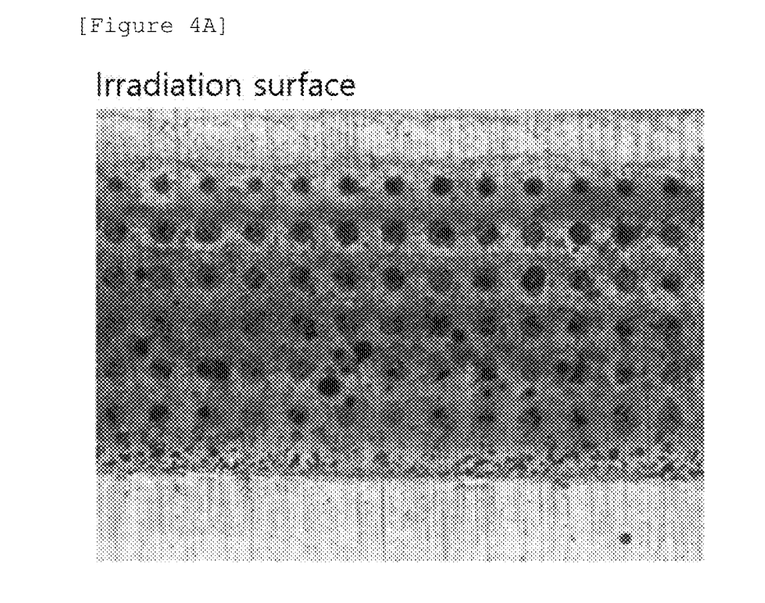
FIG. 4A is a view illustrating an image captured by using an optical microscope at an irradiation surface of an electrode welded according to Example 1.
Figure 4B:
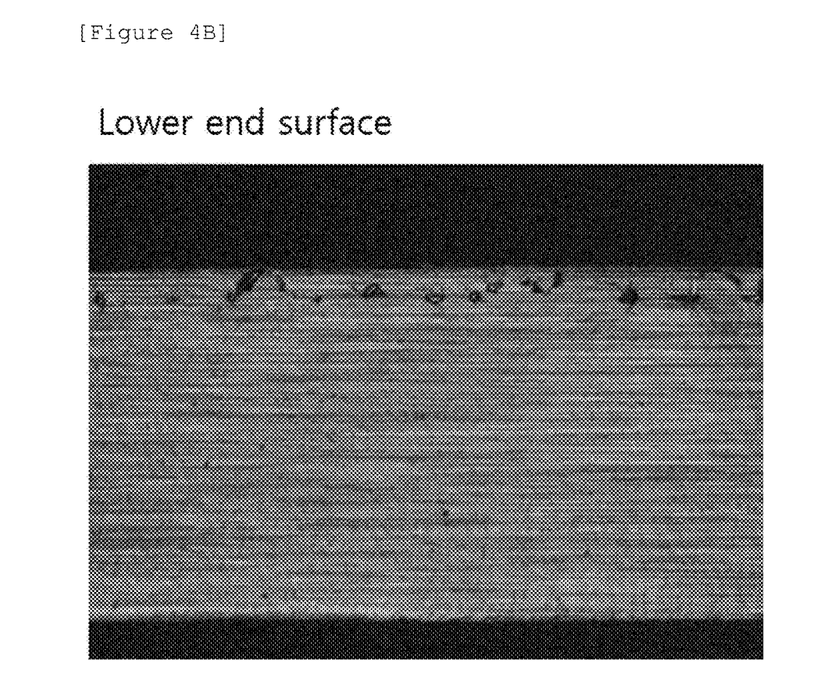
FIG. 4B is a view illustrating an image captured by using an optical microscope at a lower end surface of the electrode welded according to Example 1.

FIG. 4A is a view illustrating an image captured by using an optical microscope at an irradiation surface of the electrode welded according to Example 1, and FIG. 4B is a view illustrating an image captured by using an optical microscope at a lower end surface of the electrode welded according to Example 1.

Figure 5A:
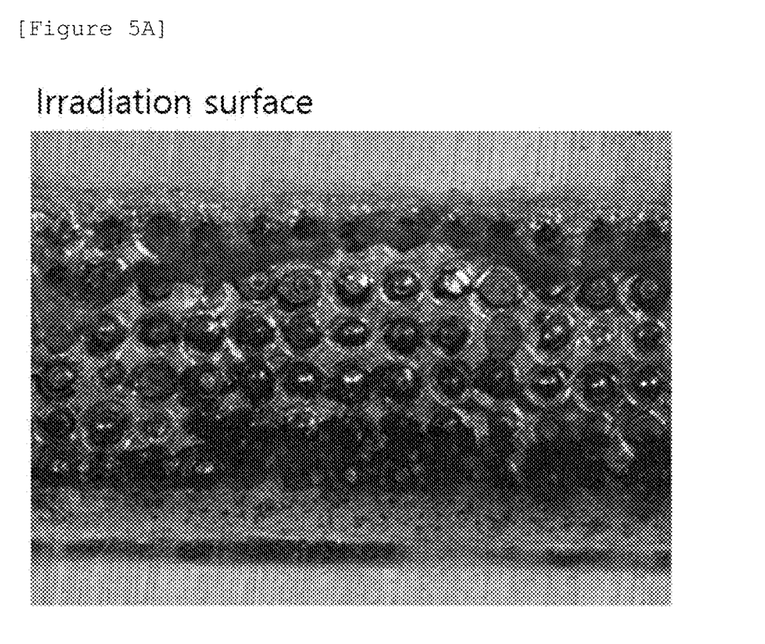
FIG. 5A is a view illustrating an image captured by using an optical microscope at an irradiation surface of an electrode welded according to Comparative Example 2.
Figure 5B:
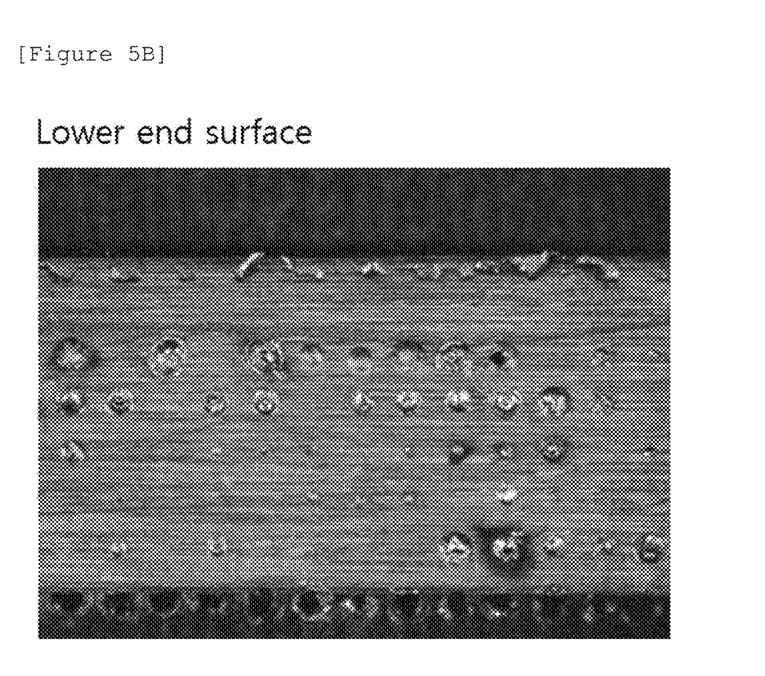
FIG. 5B is a view illustrating an image captured by using an optical microscope at a lower end surface of the electrode welded according to Comparative Example 2.

FIG. 5A is a view illustrating an image captured by using an optical microscope at an irradiation surface of the electrode welded according to Comparative Example 2, and FIG. 5B is a view illustrating an image captured by using an optical microscope at a lower end surface of the electrode welded according to Comparative Example 2.

According to FIGS. 4A, 4B, 5A, and 5B, it can be ascertained that the insulating layer and the current collecting layer at the irradiation surface and the lower end surface of the electrode according to Example 1 in which the pulsed laser beam having pulse energy of 12.5 mJ are emitted, are less damaged, but the electrode is contaminated due to damage to the insulating layer and the current collecting layer at the irradiation surface and the lower end surface of the electrode according to Comparative Example 2 in which the pulsed laser beam having pulse energy of 50 mJ is emitted.

Collectively, it can be ascertained that when the pulsed laser beam having pulse energy within the range according to the exemplary embodiment of the present invention is emitted, damage to the insulating layer and the current collecting layer may be minimized, and the electrode may have the tensile strength value which may be applied to the cable type rechargeable battery.

Tables 3 and 4 show tensile strength of the electrodes for a rechargeable battery which are welded by the pulsed laser beams of which the spot spacing distances vary. According to Tables 2 and 3, it can be ascertained that the tensile strength of the electrode, which is made by irradiating the pulsed laser beam under a condition in which the spot spacing distance in the longitudinal direction is 0.2 mm to 0.4 mm and the spot spacing distance in the width direction is 0.2 mm to 0.3 mm, may be applied to the cable type rechargeable battery, and it can be ascertained that in the case of Comparative Examples 4 and having conditions deviating from the aforementioned condition, the electrodes have the tensile strength value that may be applied to the cable type rechargeable battery, but the electrodes cannot be applied to the cable type rechargeable battery due to damage to the insulating layers.

Figure 6A:
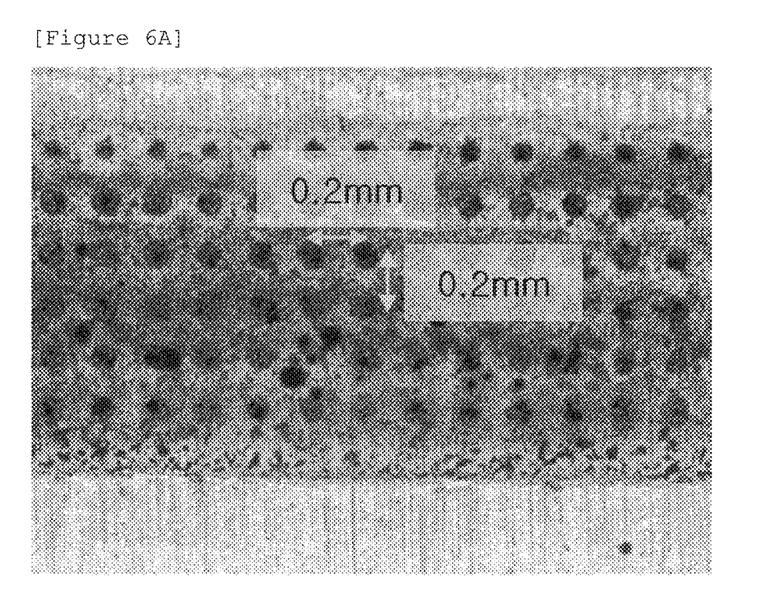
FIG. 6A is a view illustrating an image which shows a spot spacing distance and is captured by using an optical microscope at the irradiation surface of the electrode welded according to Example 1.
Figure 6B:
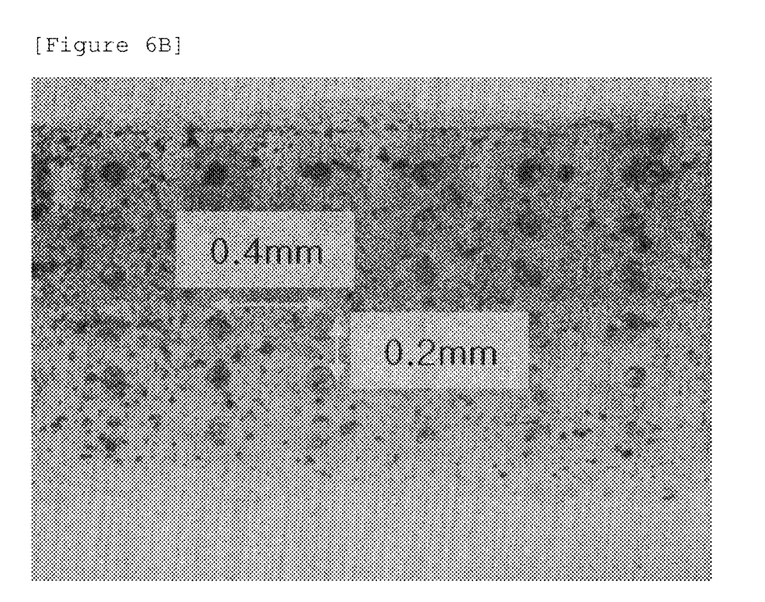
FIG. 6B is a view illustrating an image which shows a spot spacing distance and is captured by using an optical microscope at an irradiation surface of an electrode welded according to Example 5.
Figure 6C:
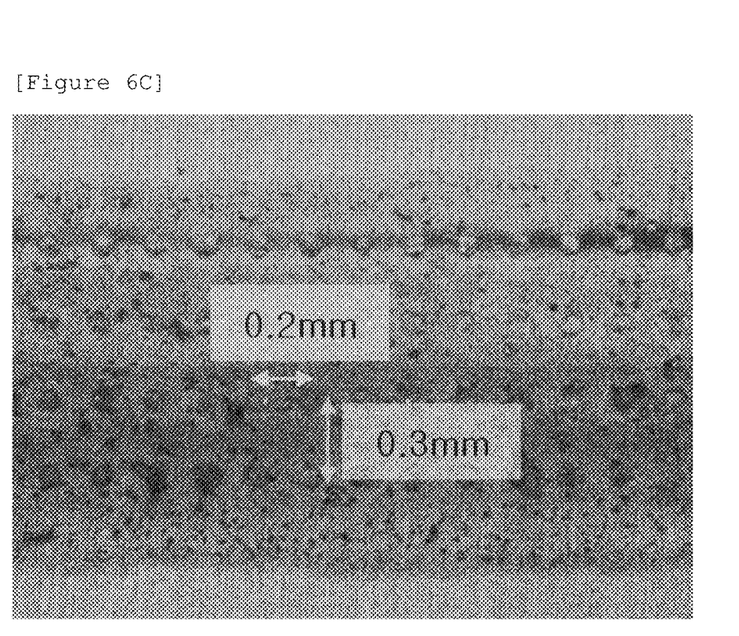
FIG. 6C is a view illustrating an image which shows a spot spacing distance and is captured by using an optical microscope at an irradiation surface of an electrode welded according to Example 6.

FIG. 6A is a view illustrating an image showing a spot spacing distance which is captured by using an optical microscope at the irradiation surface of the electrode welded according to Example 1, FIG. 6B is a view illustrating an image showing a spot spacing distance which is captured by using an optical microscope at the irradiation surface of the electrode welded according to Example 5, and FIG. 6C is a view illustrating an image showing a spot spacing distance which is captured by using an optical microscope at the irradiation surface of the electrode welded according to Example 6.

According to FIGS. 6A, 6B, and 6C, it can be ascertained that damage, which is caused, by a leak of the current collecting layer, to the irradiation surfaces of the electrodes according to Examples 1, 5, and 6 in which the pulsed laser beam is emitted under the condition in which the spot spacing distance in the longitudinal direction is 0.2 mm to 0.4 mm and the spot spacing distance in the width direction is 0.2 mm to 0.3 mm, is minimized Collectively, it can be ascertained that damage to the insulating layer and the current collecting layer may be minimized by irradiating the pulsed laser beam having the spot spacing distance within the range according to the exemplary embodiment of the present invention, and the manufactured electrode may have a tensile strength value that may be applied to the cable type rechargeable battery.

DESCRIPTION OF MAIN REFERENCE NUMERALS OF DRAWINGS

10: Insulating layer
20: Current collecting layer
30: Primer layer
40: Electrode active material layer
50: Electrode tab
100: Electrode stack
200: Pulsed laser beam

The invention claimed is:

1. A method of welding an electrode tab, the method comprising:
 preparing an electrode stack by sequentially stacking an insulating layer, a current collecting layer, and a primer layer;
 forming an electrode active material layer directly on the primer layer and the primer layer has a region having no active material where the primer layer is exposed in the stacking direction;
 laminating an electrode tab directly on the primer layer in the region in which the primer layer is exposed; and
 welding the electrode tab and the current collecting layer by irradiating a pulsed laser beam,
 wherein transmittance of the insulating layer is 50% or more at a wavelength of 400 nm to 1,200 nm, and the pulsed laser beam penetrates through the insulating layer and is emitted in a direction from the insulating layer to the current collecting layer,
 wherein pulse energy from the pulsed laser beam is 10 mJ to 30 mJ,
 wherein a spot spacing distance of the pulsed laser beam in a longitudinal direction is 0.15 mm to 0.45 mm, and
 wherein a spot spacing distance of the pulsed laser beam in a width direction of the electrode is 0.15 mm to 0.35 mm.

2. The method of claim 1, wherein the forming of the electrode active material layer includes providing the electrode active material layer on the primer layer, and exposing one region of the primer layer by removing one region of the electrode active material layer.

3. The method of claim 1, wherein the forming of the electrode active material layer includes providing the electrode active material layer on the primer layer in a way to expose a region of the primer layer.

4. The method of claim 1, wherein the welding of the electrode tab and the current collecting layer includes removing the primer layer in contact with the electrode tab by irradiating the pulsed laser beam, and welding the electrode tab and the current collecting layer.

5. The method of claim 1, wherein the pulsed laser beam is emitted by being focused on the current collecting layer.

6. The method of claim 1, wherein a thickness of the primer layer is 1 µm to 10 µm.

7. The method of claim 1, wherein a thickness of the current collecting layer is 5 µm to 30 µm.

8. The method of claim 1, wherein a thickness of the insulating layer is 5 µm to 30 µm.

9. The method of claim 1, wherein a thickness of the electrode tab is 80 µm to 500 µm.

10. The method of claim 1, wherein a thickness of the electrode active material layer is 20 µm to 150 µm.

11. The method of claim 1, wherein the electrode stack further includes a bonding layer between the current collecting layer and the insulating layer.

12. The method of claim 11, wherein a thickness of the bonding layer is 1 µm to 5 µm.

13. The method of claim 1, wherein a spot size of the pulsed laser beam is 50 µm to 150 µm.

14. The method of claim 1, wherein a wavelength of the pulsed laser beam is 400 nm to 1,200 nm.

15. The method of claim 1, wherein the method of welding an electrode tab is a method of welding an electrode tab for a cable type rechargeable battery.

\* \* \* \* \*